(12) United States Patent
Barbu-Roth et al.

(10) Patent No.: US 10,321,771 B2
(45) Date of Patent: Jun. 18, 2019

(54) DEVICE FOR ASSISTING THE CRAWLING OF AN INFANT

(71) Applicants: Universite Paris Descartes, Paris (FR); Centre National de la Recherche Scientifique (CNRS), Paris (FR); Ecole Pratique Des Hautes Etudes, Paris (FR); San Francisco State University, San Francisco, CA (US)

(72) Inventors: Marianne Barbu-Roth, Paris (FR); Vincent Forma, Saint André de la Roche (FR); Caroline Teulier, Gif S/Yvette (FR); David Anderson, Pleasanton, CA (US); Joëlle Provasi, Massy (FR); Benoist Schaal, Ternant (FR)

(73) Assignees: Universite Paris Descartes (FR); Centre National de la Recherche Scientifique (CNRS) (FR); Ecole Pratique Des Hautes Etudes (FR); San Francisco State University, San Francisco, CA (US)

( * ) Notice: Subject to any disclaimer, the term of this patent is extended or adjusted under 35 U.S.C. 154(b) by 0 days.

(21) Appl. No.: 15/326,843

(22) PCT Filed: Jul. 16, 2015

(86) PCT No.: PCT/EP2015/066359
§ 371 (c)(1),
(2) Date: Jan. 17, 2017

(87) PCT Pub. No.: WO2016/009022
PCT Pub. Date: Jan. 21, 2016

(65) Prior Publication Data
US 2017/0202367 A1    Jul. 20, 2017

(30) Foreign Application Priority Data

Jul. 17, 2014  (EP) .................................. 14306163

(51) Int. Cl.
A47D 13/08   (2006.01)
G09B 19/00   (2006.01)

(52) U.S. Cl.
CPC ........... A47D 13/08 (2013.01); G09B 19/003 (2013.01)

(58) Field of Classification Search
CPC ...... A47D 13/04; A47D 13/08; A47D 13/043; A47D 13/046
(Continued)

(56) References Cited

U.S. PATENT DOCUMENTS 1,572,273 A * 2/1926 Elton ............... A47D 13/08
                                              280/87.051
2,839,766 A * 6/1958 Hull ................ A47C 16/00
                                              5/632
(Continued)

FOREIGN PATENT DOCUMENTS

ES    2411970 A1    7/2013
GB    2124507 A *   2/1984  ............ A47D 13/04
(Continued)

OTHER PUBLICATIONS

International Search Report for Application No. PCT/EP2015/066359 dated Sep. 24, 2015.

Primary Examiner — Jacob B Meyer
(74) Attorney, Agent, or Firm — Lerner, David, Littenberg, Krumholz & Mentlik, LLP (57) ABSTRACT

Device for assisting crawling of an infant (2) on a training surface comprising: - a platform (1) comprising a chest supporting surface for supporting a chest of the infant (2) resting on the platform (1) in a prone position, and - rolling (Continued)

elements (9) rotatably mounted on the platform in such a way they can rotate 360 degrees (1) and arranged to be located between the platform (1) and the training surface, wherein the platform (1) is shaped so that, when the rolling elements (9) are in contact with the training surface, the chest supporting surface of the platform (1) is inclined relative to the training surface, so that the pelvis and the legs of the infant (2) are in contact with the training surface.

23 Claims, 8 Drawing Sheets (58) Field of Classification Search
USPC .................................................. 280/87.051
See application file for complete search history.

(56) References Cited

U.S. PATENT DOCUMENTS

| | | | | |
|---|---|---|---|---|
| 2,876,459 | A * | 3/1959 | Ackerson | A47D 5/00 4/572.1 |
| 3,129,952 | A * | 4/1964 | Rivers | A47D 13/043 280/87.051 |
| 3,271,028 | A * | 9/1966 | Albin | A63B 21/00047 482/142 |
| 3,532,356 | A * | 10/1970 | Lillibridge | A47D 13/04 248/431 |
| 3,905,054 | A * | 9/1975 | Windsor | A61G 1/044 280/87.021 |
| 3,992,023 | A * | 11/1976 | Moorer | A61G 5/00 280/87.021 |
| 4,189,164 | A * | 2/1980 | Moorer | B62B 7/12 280/87.05 |
| D261,378 | S * | 10/1981 | Bergeron | D12/128 |
| 4,413,832 | A * | 11/1983 | Pendleton | A63C 5/00 280/18 |
| 4,569,532 | A * | 2/1986 | Mirkarimi | B62B 7/00 280/32.5 |
| 4,796,903 | A * | 1/1989 | Proctor | A47D 13/04 280/32.5 |
| 5,046,750 | A * | 9/1991 | Heubl | B62K 9/00 280/47.34 |
| 5,588,445 | A * | 12/1996 | Obaidi | A47D 13/04 128/846 |
| 5,599,063 | A * | 2/1997 | Lister | A47D 1/002 297/256.11 |
| 5,639,105 | A * | 6/1997 | Summo | A61G 5/00 280/149.2 |
| 5,675,853 | A * | 10/1997 | Linge | A47D 13/08 5/417 |
| 5,815,862 | A * | 10/1998 | Rygiel | A47C 27/081 5/632 |
| 6,019,705 | A * | 2/2000 | Thom | A47D 13/04 482/51 |
| 6,128,797 | A * | 10/2000 | Shaffer | A47C 16/00 5/638 |
| 7,032,907 | B1 * | 4/2006 | Marsh | B25H 5/00 280/32.5 |
| 7,107,639 | B2 * | 9/2006 | Taricani | A47D 13/08 5/655 |
| 7,117,553 | B2 * | 10/2006 | Fairchild | A47D 13/08 5/655 |
| 7,182,351 | B2 * | 2/2007 | Williams | A47D 13/04 280/32 |
| 7,367,570 | B1 * | 5/2008 | Marsh | B25H 5/00 280/32.5 |
| 7,685,656 | B1 * | 3/2010 | Darrigo | A61G 7/103 16/436 |
| 8,028,361 | B2 * | 10/2011 | Ramer | A47D 13/08 128/845 |
| 8,038,158 | B1 * | 10/2011 | White | A47D 13/08 280/32.5 |
| 8,942,874 | B2 * | 1/2015 | Pidcoe | A47D 13/04 280/149.2 |
| 9,693,637 | B1 * | 7/2017 | Kanzler | A47D 13/04 |
| 2002/0133881 | A1 * | 9/2002 | Vrbas | A47D 13/08 5/655 |
| 2005/0248110 | A1 * | 11/2005 | Stouffer | A61G 5/00 280/87.021 |
| 2005/0278854 | A1 * | 12/2005 | Taricani, Jr. | A47D 13/08 5/655 |
| 2006/0066067 | A1 * | 3/2006 | Williams | A47D 13/04 280/87.051 |
| 2006/0096031 | A1 * | 5/2006 | Foster | A47D 13/08 5/655 |
| 2010/0319133 | A1 * | 12/2010 | Whitlock | A47D 13/08 5/655 |
| 2011/0041251 | A1 * | 2/2011 | Ramer | A47D 13/08 5/655 |
| 2011/0265264 | A1 * | 11/2011 | Reeder, Jr. | A47D 15/008 5/640 |
| 2012/0192354 | A1 * | 8/2012 | Baldwin | A47D 13/08 5/655 |
| 2012/0284925 | A1 * | 11/2012 | Bennett | A47D 15/005 5/655 |
| 2013/0144475 | A1 * | 6/2013 | Pidcoe | A47D 13/04 701/22 |
| 2014/0189956 | A1 * | 7/2014 | Sosi | A47D 13/08 5/655 |
| 2014/0291952 | A1 * | 10/2014 | Lehman | A47D 13/04 280/79.6 |
| 2016/0166083 | A1 * | 6/2016 | Carbone | A47D 13/04 5/655 |
| 2017/0202367 | A1 * | 7/2017 | Barbu-Roth | A47D 13/08 |

FOREIGN PATENT DOCUMENTS

| | | | | |
|---|---|---|---|---|
| JP | 2001054449 A | * | 2/2001 | ............ A47D 13/04 |
| WO | 8900126 A1 | | 1/1989 | |
| WO | 2008079019 A1 | | 7/2008 | |
| WO | 2011146795 A2 | | 11/2011 | |

* cited by examiner

DEVICE FOR ASSISTING THE CRAWLING OF AN INFANT

CROSS REFERENCE TO RELATED APPLICATIONS

The present application is a national phase entry under 35 U.S.C. § 371 of International Application No. PCT/EP2015/066359 filed Jul. 16, 2015, published in English, which claims priority from European Patent Application No. 14306163.8, filed Jul. 17, 2014, the disclosures of which are hereby incorporated herein by reference.

FIELD OF THE INVENTION

The present invention relates to a device for assisting infant's crawling from birth.

BACKGROUND DESCRIPTION

Training locomotion as early as possible is crucial for infants at risk for developing locomotor delays. Upright locomotion is difficult to exercise in these infants, especially from birth, as their body tone is low. Crawling is a better candidate because it not only eliminates the upright postural problem, but, also, exercises the arms to move in coordination with the legs, with arm movement being an important factor in mature bipedal locomotion. Moreover, crawling naturally exists at birth and as such is an excellent candidate for early training of locomotion. Training crawling on a mattress at birth, especially in infants with low body tone, has nevertheless to overcome one obstacle: supporting the weight of the head and the chest of the infant away from the surface in order not to block the infant's forward propulsion and to allow the arms to move. Pediatricians and kinesitherapists usually try to overcome this problem of helping infants to crawl by manually raising the infant's head and trunk off the floor and pulling them forward. This practice requires very specific skills that all pediatricians do not have, and influences the infant's movements depending on the manner in which the pediatrician supports the infant.

Devices for assisting infant crawling are already known, but are designed for infants of at least a few months of age. For example, document WO2011/146795 discloses a device facilitating crawling of infants who are at least 4 months of age and unable to propel themselves. The device is comprised of a motorized horizontal wheeled platform, on which the infant is placed in a horizontal prone position, that senses the infant's intent to move their legs and arms and engages movements of the wheels depending on the infant's intent, regardless of whether the infant's movements are effective or not. The device is not designed to enable the infant to move by his own strength as the strength of the arm and leg muscles needed to move the device is minimal. Therefore, it does not push the infant to express his maximal crawling muscle activity.

SUMMARY OF THE INVENTION

One aim of the present invention is to provide a device for assisting infant crawling, allowing the infant to express and develop his own maximal arm and leg muscle activity for quadrupedal propulsion.

This problem is solved, according to the invention, thanks to a device for assisting crawling of an infant on a training surface comprising:

a platform comprising a chest-supporting surface for supporting a chest of the infant resting on the platform in a prone position, and rolling elements rotatably mounted on the platform and located between the platform and the training surface, wherein the platform is shaped so that, when the rolling elements are in contact with the training surface, the chest supporting surface of the platform is inclined relative to the training surface, so that the pelvis and the legs of the infant are in contact with the training surface.

The proposed device allows the pelvis and the legs of the infant to remain in contact with the training surface, while raising the chest and allowing the infant to put his forearms on the surface. As a result, the infant can move relative to the training surface by using the maximal force of its arm and leg muscles, while having the upper part of its body relieved from the force of gravity.

In addition, the device may have the following features:
- the chest supporting surface is inclined relative to the training surface to an angle between 15° and 30°;
- the platform comprises:
  - a rigid plate which is parallel to the training surface, when the rolling elements are in contact with the training surface;
  - an expanded material inner structure having a first rigidity and a lower surface in contact with the rigid plate and an upper surface which is inclined relative to the lower surface, and
  - a foam structure having a second rigidity, greater than the first rigidity and a lower surface in contact with the rigid plate and an upper surface which is parallel relative to the lower surface, and
  - a foam outer layer which covers the upper surface of the inner structure;
- the platform comprises a head supporting surface, formed by the foam structure, for supporting a head of the infant, the head supporting surface being parallel to the training surface when the device is positioned with the rolling elements in contact with the training surface;
- the expanded material inner structure comprises:
  - a chest supporting element comprising an upper and a lower surface;
  - a junction element joining the chest supporting element and the head supporting element and comprising an upper and a lower surface,
  - the upper surface of the chest supporting element and the upper surface of the junction element are covered by the foam outer layer, the upper surface of the foam outer layer that covers the upper surface of the chest supporting element and the upper surface of the foam outer layer that covers the upper surface of the junction element are inclined with an angle γ set between 35° and 55°;
- the platform comprises a stabilizing system for preventing overturn of the device;
- the stabilizing system comprises two balancing arms extending from both sides of the head supporting surface;
- at least one rolling element is rotatably mounted on each balancing arm;
- each balancing arm is bent so that the balancing arms do not obstruct movements of infant's arms when the infant is crawling;
- the platform comprises two notches arranged on both sides of the infant's shoulders to leave the infant's arms free and unconstrained;

the platform comprises a harness coat for securing the infant on the platform and wrapping the infant on the platform;

the harness coat comprises several pieces of flexible fabric material adapted to overlap, and connecting elements that connect the overlapping pieces together.

The invention also relates to a method of using a device as defined previously, comprising the following steps:

putting the infant on the device so as the chest of the infant rests on the chest supporting surface;

analyzing the infant crawling by analyzing an infant's crawling pattern.

The invention also relates to a method of using a device as defined previously, comprising the following steps:

putting the infant on the device so as the chest of the infant rests on the chest supporting surface;

stimulating the infant so as to make the infant crawl;

analyzing the infant crawling by measuring sensitivity and reactivity of the infant to the stimulation.

The invention also relates to a method of using a device as defined previously, comprising a mobility test, in which the three following steps are repeated:

putting the infant on the device by making the chest of the infant resting on the chest supporting surface;

leaving the infant move freely by crawling during a time period comprised between 1 minute and 3 minutes;

recording characteristics and efficiency parameters of the infant's crawling;

wherein, the mobility test comprises a pause time between each series of the three previous steps.

According to a possible embodiment of the invention, if the infant does not crawl during the mobility test, the method comprises the following step:

repeating the mobility test by passively helping the infant to crawl by using a pushing support, enabling said infant to push with his legs in the pushing support;

According to a possible embodiment of the invention, if the infant does not crawl during the mobility test with the pushing support, the method comprises the following step:

repeating the mobility test by actively helping the infant to crawl by pushing said infant in order to initiate a crawling movement from the infant, and passively helping said infant by keeping the pushing support.

In addition, the two previous methods may be carried out as follows:

projecting optic flows around the infant so as to give an illusion of movement to said infant;

modifying the slope of the training surface so as to increase or decrease the difficulty of crawling for said infant;

using motivation factors as music, maternal voice, moving objects and/or odors, so as to motivate said infant to crawl;

using adhesive socks worn by said infant so as to increase the adhesion of the feet of said infant to the training surface.

BRIEF DESCRIPTION OF THE DRAWINGS

The invention will be described with reference to the drawings, in which.

DETAILED DESCRIPTION

Device Structure

Figure 1:
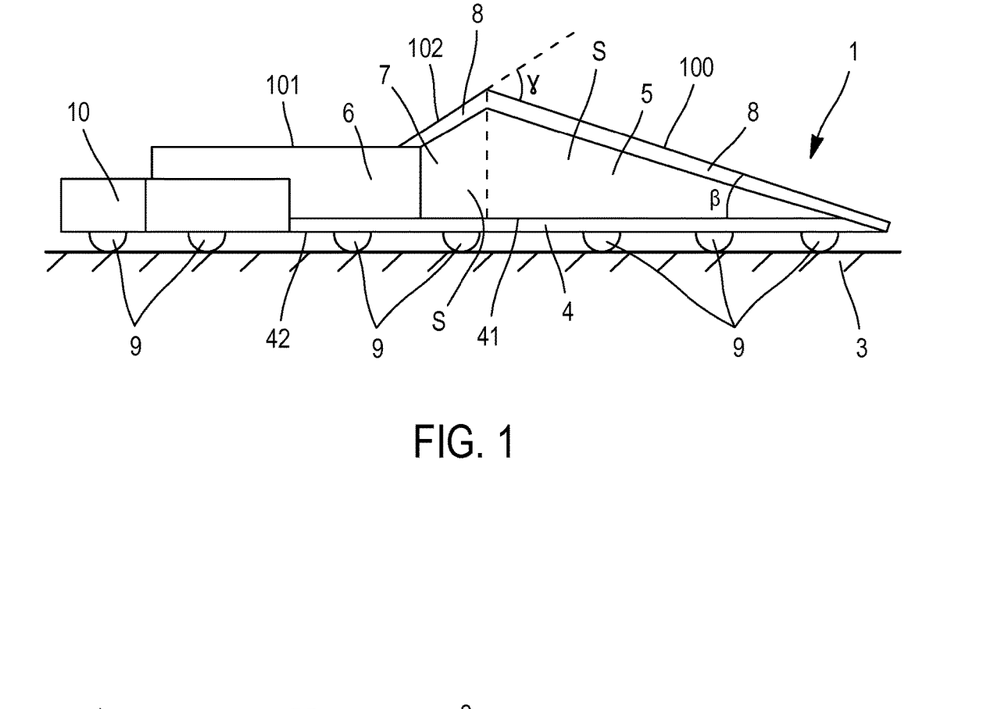
FIG. 1 is a schematic side view of a device for assisting crawling of an infant according to a first embodiment of the invention.
Figure 2:
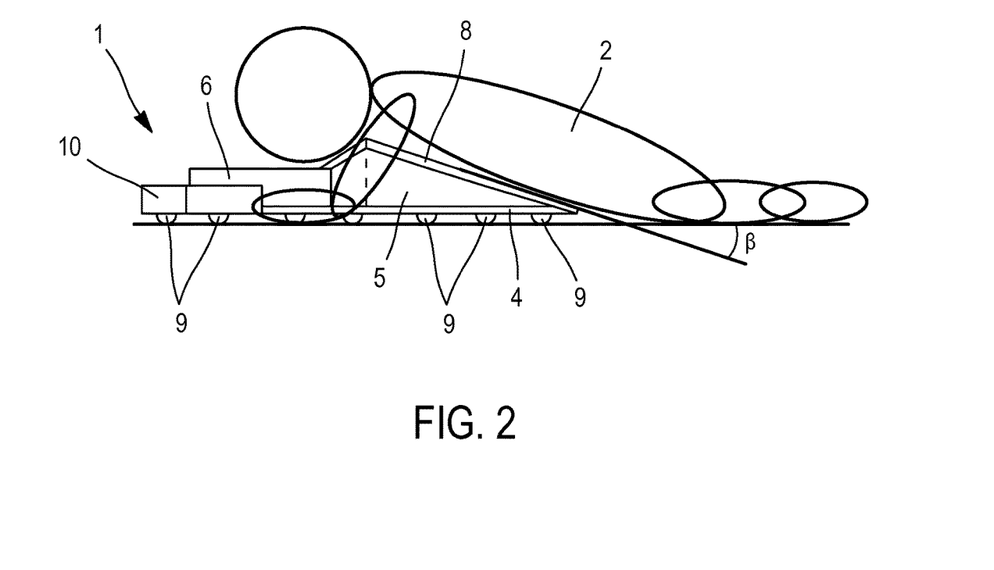
FIG. 2 is a schematic side view of the device shown in FIG. 1 in which an infant is positioned.
Figure 3:
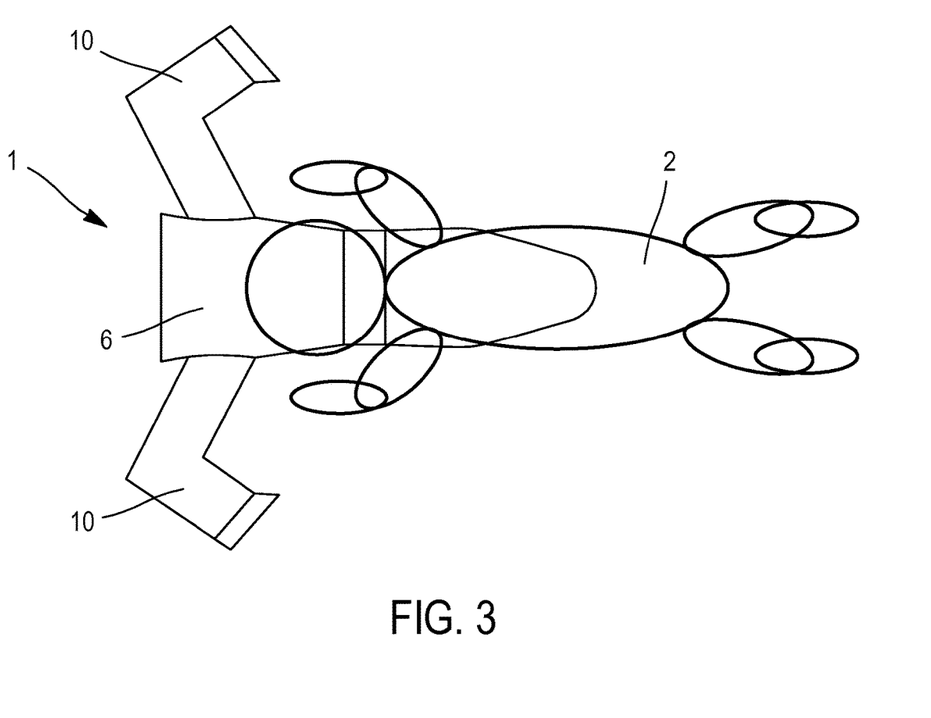
FIG. 3 is a schematic top view of the device shown in FIG. 1 in which an infant is positioned.

According to the first embodiment illustrated in FIGS. 1, 2 and 3, the device comprises a platform 1 positioned on a training surface 3 and rolling elements rotatably mounted on the platform 1. The rolling elements 9 are positioned between the platform and the training surface. In use, an infant 2 is positioned in a prone position on the platform 1.

According to the first embodiment, the device also comprises an inner structure S made of a light and rigid material, in contact with a rigid plate 4 and a low rigidity foam outer layer 8 which covers the light and rigid material inner structure.

The light and rigid material is an expanded material, like expanded polystyrene, in order to have the best compromise between rigidity and weight.

The inner structure S is made of the light and rigid material in order to have the best compromise between rigidity and weight. Indeed, the inner structure must be resistant enough for supporting the weight of the infant 2 while being as light as possible.

According to the first embodiment, the device also comprises a low rigidity foam structure 6 in contact with the rigid plate 4 and the light and rigid material inner structure S.

The plate 4 has a rectangular shape and is made of a rigid material, such as aluminum. The plate 4 comprises a top surface 41 and a bottom surface 42. The plate 4 forms a base for the platform 1.

The light and rigid material inner structure S comprises a chest supporting element 5, and a junction element 7.

The chest supporting element 5 comprises an upper surface arranged to support the infant's chest and a lower surface in contact with the top surface 41 of the plate 4.

The junction element 7 joins the chest supporting element 5 and the low rigidity foam structure 6. The junction element 7 comprises an upper surface which also supports the infant's head, which is the outer layer 8, and a lower surface in contact with the top surface 41 of the plate 4. More precisely, the upper surface of the junction element 7 supports the infant's chin.

The outer layer 8 is a comfort layer made of low rigidity foam positioned on the upper surface of the chest supporting element 5 and the upper surface of the junction element 7. The comfort layer 8 minimizes irritation of the infant's skin, which is very sensitive.

The low rigidity foam structure 6 forms a head supporting element which comprises an upper surface which supports the infant's head, and a lower surface in contact with the top surface 41 of the plate 4. More precisely, the upper surface is arranged to support the infant's face.

The rolling elements 9 are rotatably mounted under the bottom surface 42 of the plate 4 in such a way that they can rotate 360 degrees. When the device is in use, the rolling elements 9 are positioned between the plate 4 and the training surface 3. The rolling elements 9 enable the platform 1 to roll in any direction on the training surface 3 when the infant 2 pushes with his legs and/or with his arms on the training surface. The height of the rolling elements is minimal in order to keep the total height of the device compatible with the possibility for the infant to comfortably put his elbows and/or hands on the surface 3. Therefore, the height of the rolling elements 9 between the training surface 3 and the rigid platform must be lower than 1 cm. In the first embodiment, the height of the rolling element 9 is 9 mm.

The platform 1 also comprises a stabilizing system comprising two balancing arms 10 extending from both sides of the low rigidity foam structure 6. The stabilizing system prevents the platform 1 from overturning.

According to the first embodiment, the platform 1 has a chest supporting surface 100, a head supporting surface 101 and a junction surface 102.

The chest supporting surface 100 supports the chest of the infant 2 resting on the platform 1. The chest supporting surface 100 is made by a part of the comfort layer 8 which covers the upper surface of the chest supporting element 5.

The head supporting surface 101 supports the head of the infant. The head supporting surface 101 is parallel to the training surface. The head supporting surface 101 is formed by the upper surface of the head supporting element formed by the low rigidity foam structure 6.

The junction surface 102 joins the chest supporting surface 100 and the head supporting surface 101. The junction surface 102 is made by a part of the comfort layer 8 which covers the upper surface of the junction element 7.

By supporting the infant 2, the device compensates for the effect of gravity on the head and chest, which effect blocks the movements of the arms and forward propulsion, the primary inhibitor of natural crawling. Indeed, while the infant 2 is positioned on the platform 1 in a prone position, he does not support his own head and chest weight for moving while keeping the pelvis and the legs in contact with the training surface, maximizing the force of his legs for propulsion.

When the rolling elements 9 are in contact with the training surface 3, the plate 4 extends parallel to the training surface 3.

The inclined upper surface and the horizontal lower surface of the chest supporting element 5 form an angle $\beta$ between 15° and 30°. Advantageously $\beta$ is about 23°. When the rolling elements 9 are in contact with the training surface 3, the comfort layer 8, that covers the upper surface of the chest supporting element 5, is inclined relative to the training surface 3 with the angle $\beta$. This angle $\beta$ enables the infant 2 to have his pelvis and his legs in contact with the training surface 3. The length of the upper surface of the chest supporting element 5 is adapted to the size of the infant 2 in order for the infant's forearms to be in contact with the training surface 3 when the infant 2 is supported by the upper surface of the chest supporting element 5 and has his pelvis and his legs in contact with the training surface 3. The fact that the infant 2 has his pelvis, his legs and his forearms in contact with the training surface 3, while he does not support his own weight, enables the infant 2 to crawl and move by his own strength, thus developing his motor capacities, like strength and coordination.

The upper surface of the low rigidity foam structure 6 is parallel to the upper surface 41 of the plate 4 and thus also parallel to the training surface 3 when the device 1 is positioned with the rolling elements 9 in contact with the training surface.

The junction element 7 is inclined relative to the upper surface of the chest supporting element 5 with an angle $\gamma$ between 35° and 55°. Advantageously $\gamma$ is about 45°. This angle $\gamma$ enables the upper surface of the head supporting element to support the infant's head so that the infant does not need to put a strain on his neck muscles when he is crawling. With such a junction element 7, the platform 1 can be used for assisting newborns and motor delayed infants, which have very weak neck muscles. In another embodiment, the junction element 7 can be rotatably mounted to the chest supporting element 5 in order to follow the infant's head movement.

The compressibility of the comfort layer 8 on top of the junction 7, is such that the thickness of the comfort layer 8 adapts itself to the infant's neck and head in order to adjust the angle $\gamma$ to the size of different infants 2 who can use the device 1. Indeed, the value of the angle $\gamma$ provides good support to the infant's neck and head.

The light and rigid material has a density comprised between 20 kg/m$^3$ and 35 kg/m$^3$, and the low rigidity foam has a density of about 40 kg/m$^3$.

The density of the light and rigid material can be advantageously adapted according to the weight (and therefore the age) of the infant. For example, the light and rigid material may have a density of about 28 kg/m$^3$ for a new born, and a density of about 32 kg/m$^3$ for an older infant.

The rolling elements 9 are constructed such that they enable the device to move in any direction parallel to the training surface. In a non-limiting example, the rolling elements 9 are tack-balls. In the example illustrated in FIGS. 1 to 3, the device 1 comprises ten track-balls. The rolling elements are arranged under the bottom surface of the plate 4 so as to maximize the stability of the device 1.

The two balancing arms 10 are positioned symmetrically from both sides of the head supporting element 6 in order to prevent the device from overturning. At least one rolling element 9 is mounted under each balancing arm 10, and preferably two rolling elements 9 are mounted under each balancing arm 10. The balancing arms 10 are positioned at the level of the infant's head and are bent so that the balancing arms 10 do not obstruct movement of infant's arms when the infant 2 is crawling.

In order to secure the infant 2 to the platform 1, the platform 1 comprises a harness coat. The harness coat comprises several pieces of flexible material adapted to overlap, and connecting elements for connecting the overlapping pieces together. In a non-limiting example, the harness coat comprises three fabric strips and two elastic suspenders. The harness coat covers the infant 2 when he is positioned on the platform and it also covers the bottom surface of the plate 4. The harness coat tightens around the infant 2 in order to reproduce the tightening of the arms of the infant's mother. This allows the infant 2 to feel confident and comfortable when using the device 1.

Figure 4A:
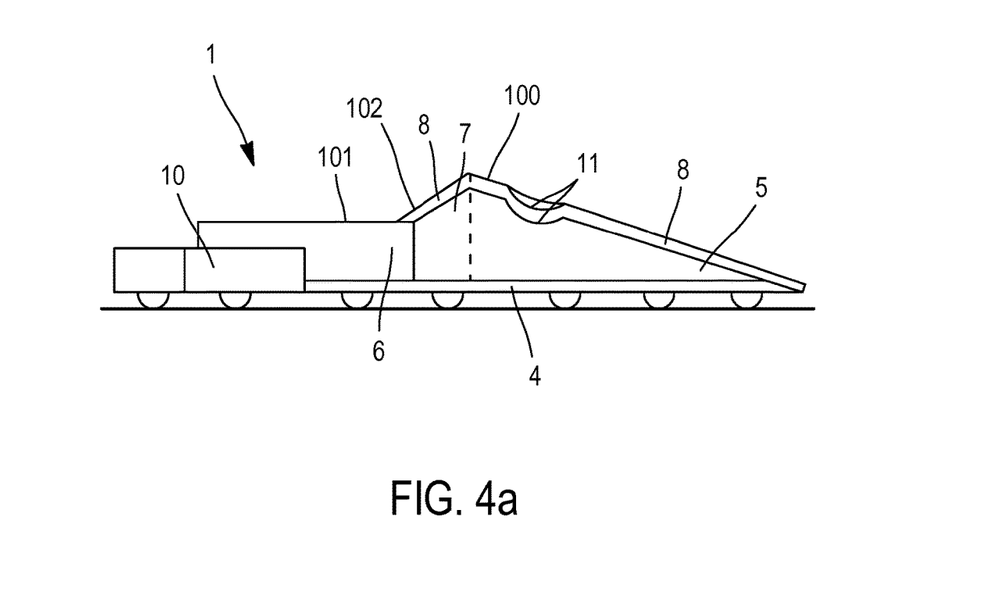
FIGS. 4a and 4b are schematic top and side views of a device for assisting crawling of an infant according to the second embodiment of the invention.
Figure 4B:
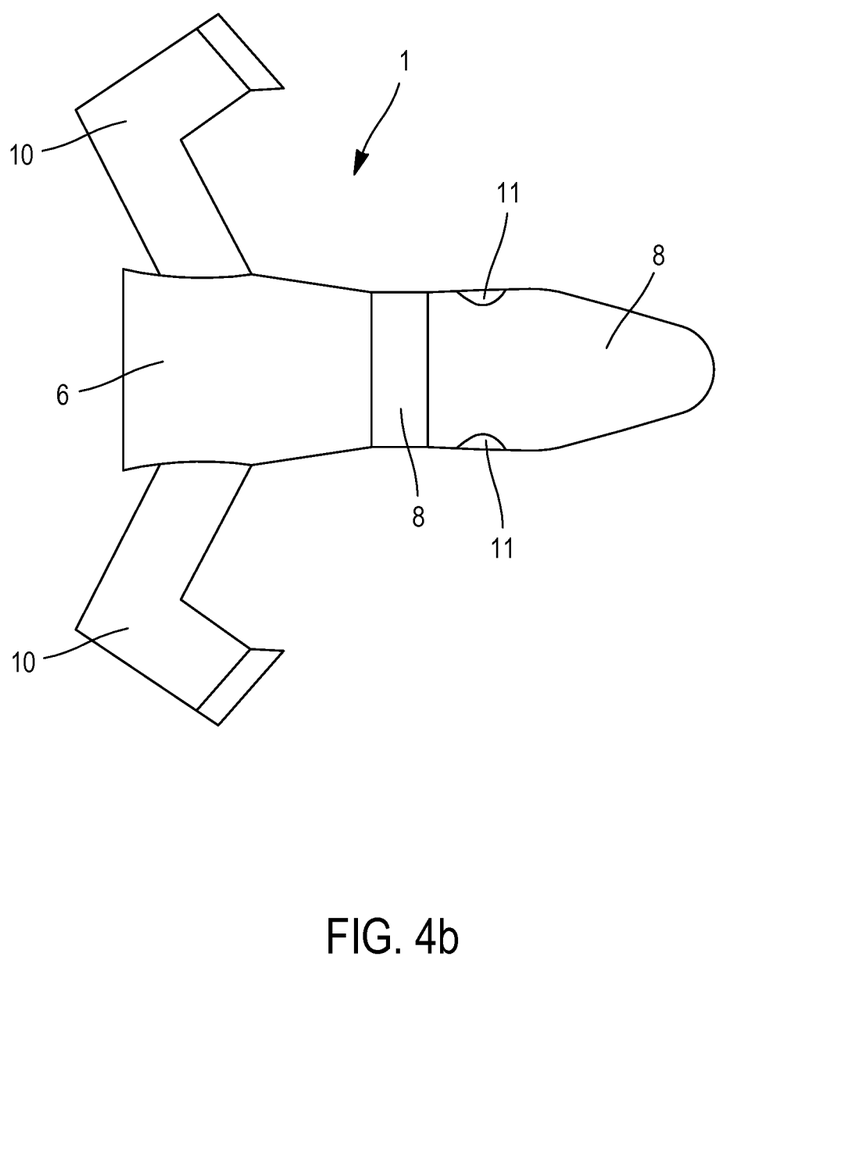

Referring to FIGS. 4a and 4b, the platform 1 according to a second embodiment of the invention comprises a chest supporting element 5 and a comfort layer 8 forming two notches 11. The notches 11 are positioned on both sides of the chest supporting element 5 and the comfort layer 8 at the infant's shoulder level. The notches 11 leave the infant's arms unconstrained in order to facilitate the infant's movements and make crawling easier for the infant.

In order to analyze the infant's movements made during his crawling, 3D captors (for three dimensions) and cameras are used, so as to record the infant's movements. The 3D captors are put on infant's body parts, which are interesting for analyzing the infant's crawling (for example the joints of the legs and arms, the head, and the trunk). The recorded movements of the infant are processed by a computer device, and thus a 3D or 2D analyze can be proceed.

Methods for Using the Device

Figure 5A:
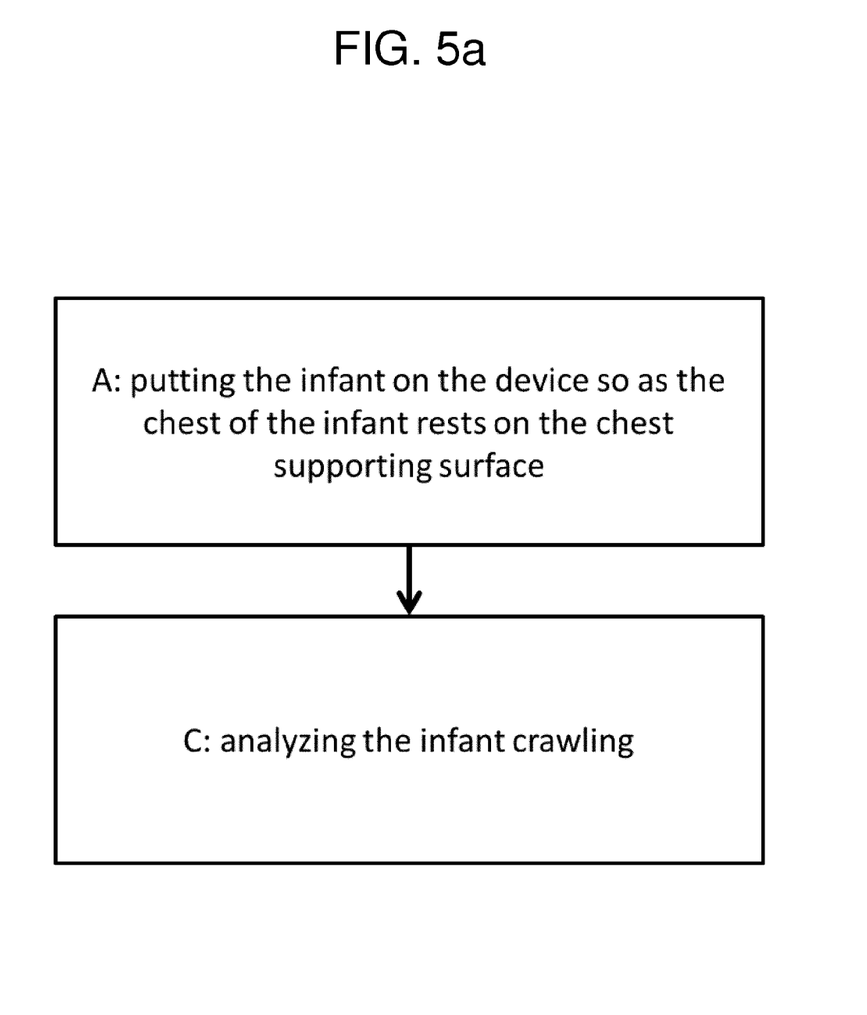
FIG. 5a is a schematic representation of a first method of using a device according to the invention.

In order to understand how the newborn and infant are able to adapt their actions to the different stimuli of their environment, and reciprocally, how their own action could map the development of their perception of their environment, a first method of using the device comprises, as represented in FIG. 5a:

a step A in which the infant 2 is put on the device so as the chest of the infant 2 rests on the chest supporting surface 100;

a step C in which the infant crawling is analyzed by analyzing an infant's crawling pattern The analyze of the infant's crawling pattern could be achieved, for example, by measuring the distance travelled by the infant 2 and/or by analyzing the coordination of legs and arms of the infant 2 during his crawling movements.

When he is put on the device, the infant 2 can freely move, therefore it is possible to analyze the spontaneous reaction of the infant when he is put on said device. Moreover, it is also possible to analyze the reaction to the infant when he is stimulated.

Figure 5B:
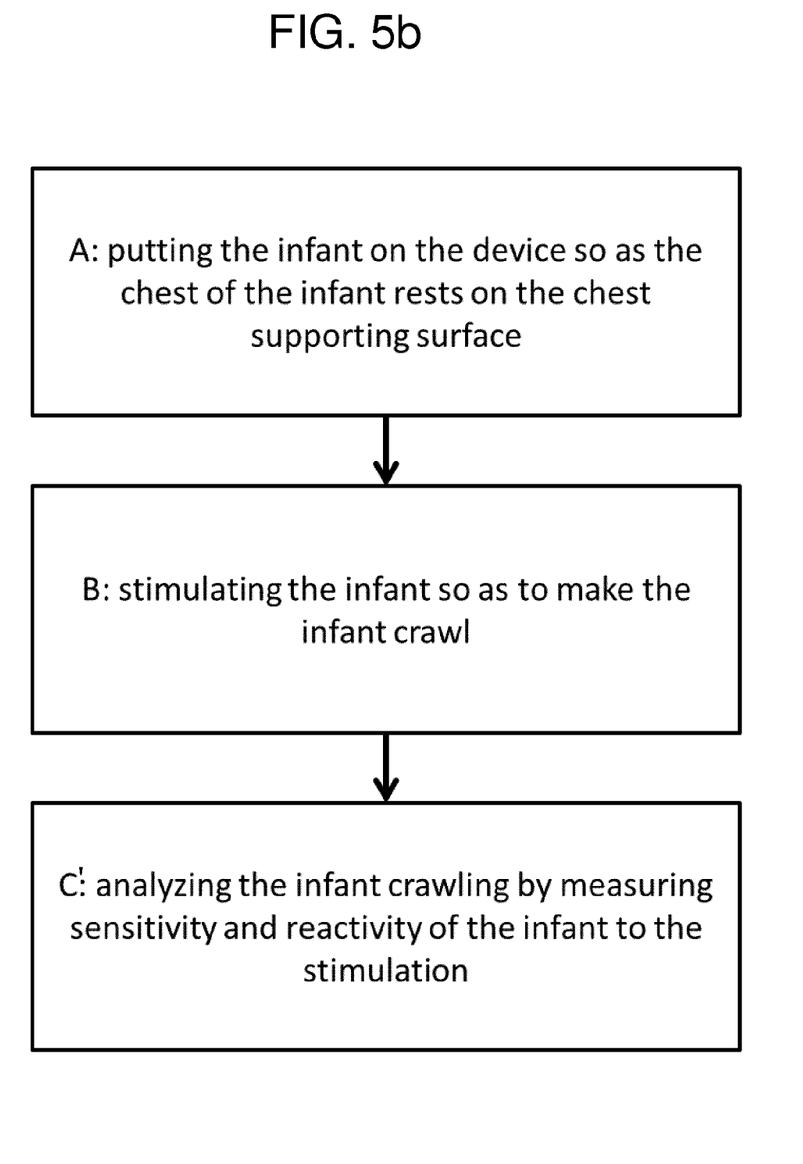
FIG. 5b is a schematic representation of a variation of the first method of using a device according to the invention.

According to a variation of the first method, as illustrated in FIG. 5b, the method comprises the following steps:

the step A, in which the infant 2 is put on the device so as the chest of the infant 2 rests on the chest supporting surface 100;

a step B, in which the infant 2 is stimulated so as to make said infant 2 crawl;

a step C' in which the infant's crawling pattern is analyzed by measuring the sensitivity and reactivity of the infant 2 to the stimulus.

The stimulus used for encouraging the infant 2 to crawl could be presented in vision (for example the infant's mother face), audition (for example the infant's mother voice), or olfaction modality (for example the infant's mother smell). The stimulus could also be multimodal, by combining visual, auditory and/or olfactory stimuli.

In this variation of the first method, the analyze of the infant crawling pattern could be achieved, for example, by measuring the distance travelled by the infant 2 toward the stimulus, by analyzing the coordination of legs and arms of the infant 2 during his crawling movements, and/or by measuring the orientation of the infant 2 regarding the stimuli.

When he is put on the device, the infant 2 can freely move, and thus the infant 2 can freely react to any stimulus presented in front of him, by moving toward the stimulus, and/or modifying the pattern of his propulsion, and/or increasing the velocity of his propulsion. All of these changes give information on the integrity of the coupling between the perception of stimuli in his environment by the infant 2 and his mobility. Moreover, all these changes can reveal if the infant 2 not only discriminates his environment, for example his mother face, but performs appropriate goal oriented mobility toward his mother face.

Such a method reveals if a newborn will initiate a complete new action in response to his mother face (by example by propelling himself and orienting his body toward his mother face). Such information cannot be obtained by studies on face discrimination based on the heart rate, movement of the eyes, movement of the head, and/or brain activity which try to detect the reaction of a new born to his mother face.

Besides, such a method enables to investigate about the different effects for the infant 2 to actively moving himself on the device versus being passively moved on it, on the development of his perception in multiple domains, visual, vestibular, tactile, etc. This investigation is important in order to explore the role of active versus passive movements in the development of the infant 2, and especially for an infant 2 which has a risk of developing motor delays.

Figure 6:
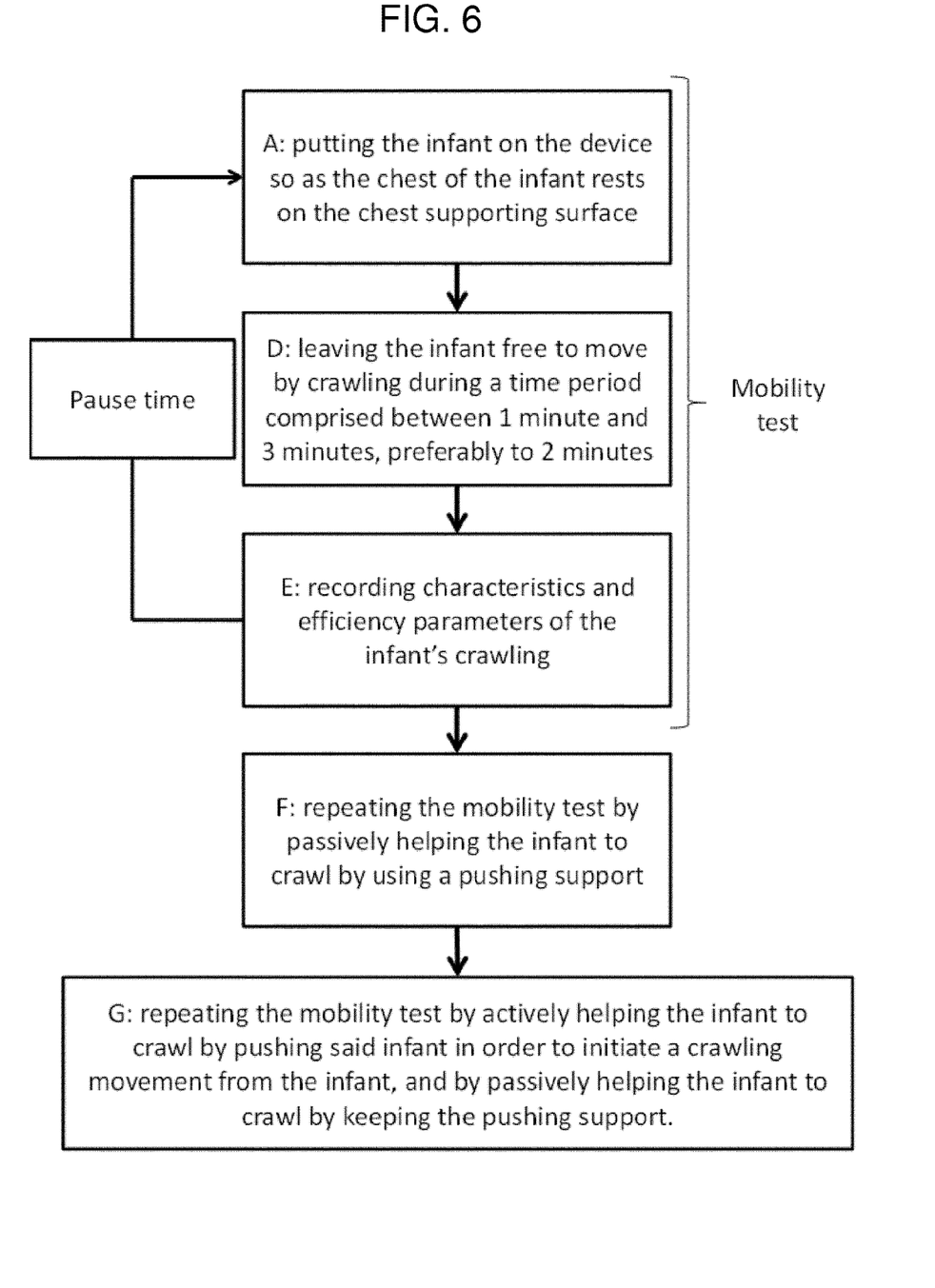
FIG. 6 is a schematic representation of a second method of using a device according to the invention.

According to a second method of using the device, as represented in FIG. 6, a method of using the device comprises a mobility test. The mobility test comprises the three followings steps which are repeated:

a step A in which an infant (2) is put on the device by making the chest of the infant (2) resting on the chest supporting surface (100);

a step D in which the infant (2) is left free to move by crawling during a time period comprised between 1 minute and 3 minutes, preferably to 2 minutes;

a step E in which characteristics and efficiency parameters of the infant's crawling are recorded;

The mobility test comprises a pause time between each series of the three steps A, D and E. This pause time is preferably a time period comprises between 4 minutes and 6 minutes, and more preferably 5 minutes. In a preferred embodiment, the mobility test comprises three series of the steps A, D and E.

In a preferred embodiment, the characteristics parameters of the infant's crawling are the distance travelled during the crawling, and/or the 3D (for 3 dimensions x, y, z) or 2D (for 2 dimensions x, y) scores of the movements of the body, the head and all the joints of the legs and arms, and/or the number of leg and arm steps made by the infant 2 during the crawling, and/or the amplitude and the angular velocity of flexions and extensions of the joints of the legs (the hips and the knees) and arms (the shoulders and the elbows) at each step made by the infant during his crawling.

In a preferred embodiment, the efficiency parameters of the infant's crawling are evaluated on the distance travelled by the infant at step D, the symmetry of movements of the infant, and/or the coordination of leg, arm, head and trunk movements.

The characteristic and efficiency parameters are obtained by using 3D captors and cameras, the captors being positioned in the member of the infant 2, so as to record the movements made by the infant 2 during his crawling. When the movements of the infant are recorded in a computer device, the infant's movements can be analyzed in 3D or in 2D. The 3D or 2D score is obtained by taking average of the traveled distance by each 3D captor disposed in a member of the infant 2.

In the second method of using the device, if the infant 2 does not crawl during the mobility test, the method could comprise:

a step F in which the mobility test is repeated by passively helping the infant 2 to crawl by using a pushing support, enabling said infant 2 to push with his legs in the pushing support.

The pushing support can be the hands of a parent of the infant 2, or a small plate which is installed at the feet of the infant 2, perpendicularly to the feet of said infant 2. The pushing support is used to offer to the infant 2 a better grip to the training surface 3, so as to facilitate his propulsion on said training surface 3. The help given in the step F is passive; therefore the movement of the infant 2 is achieved only by his own force.

In the second method of using the device, if the infant 2 does not crawl during the mobility test, even with the pushing support, the method could comprise the following step:

a step G in which the mobility test is repeated by actively helping the infant 2 to crawl by pushing said infant in order to initiate a crawling movement from the infant 2, and by passively helping the infant 2 to crawl by keeping the pushing support.

The active help given to the infant could consist of a movement impulsion given with the pushing support to the infant's foot, in an alternated manner, so as to push the infant 2 and the device, and thus initiate infant's crawling. Contrary the passive help given in step F, in which the pushing support is only put behind each foot of the infant, in the active help given in step G, the pushing support put behind each foot of the infant is used to give a movement impulsion. Moreover, in order to keep the infant 2 crawling after the impulsion given to the device, the pushing support is passively used so as to facilitate the crawling for said infant 2.

Characteristics and efficiency parameters of the infant's crawling are recorded during step E, F or G, enabling, not only to analyze all the parameters of crawling, but also to analyze the coordination of the movements of all the body made by the infant 2. Such coordination analysis is important for detecting risks of development of motor delays, especially for the newborns. The known methods, in which the movements of the arm, leg, or head are analyzed separately, cannot analyze the coordination of the movements of the different limbs of the infant 2.

The first and second methods have a plurality of variations. More precisely, in order to increase the efficiency of the first and second methods of using the device, said first and second methods comprises at least one of the following steps:

a step in which optic flows are projected around the infant 2 so as to give an illusion of movement to said infant 2;

a step in which the slope of the training surface 3 is modified so as to increase or decrease the difficulty for crawling for said infant 2;

a step in which motivation factors are used, as music, maternal voice, moving objects and/or odors, so as to motivate said infant 2 to crawl;

a step in which adhesive socks worn by said infant 2 are used, so as to increase the adhesion of the feet of said infant 2 to the training surface 3.

The projection of the optic flows modifies the environment perception of the infant 2, giving him the illusion that he moves in a different direction, and/or that he moves with a different velocity.

The modification of the slope of the training surface 3 enables to adapt the difficulty of the crawling to the infant's capacities.

The motivation factors, as the music, the maternal voice, the objects movements, and/or the odors enable to motivate the infant 2 to crawl, for example to crawl toward his mother which calls him.

The use of adhesive socks facilitates the crawling for the infant 2 by increasing the grip to the training surface 3.

Such steps facilitate the crawling of the infant 2, and such steps can be very important for infants with low weight, low muscular tone, or presenting a cerebral problem (cerebral palsy for example) in order they achieve crawling.

Experimental Results

An experiment testing the effects of the use of the device by infants has been conducted.

This experiment was conducted on three typical infants (three newborns aged of one week). Each of the three infants has been trained from birth, during 1 month, with a device according to the invention rolling on a pediatrician mat, with a training rhythm of 5 minutes per day.

Each of the three infants has been tested for his crawling capacity on the device and his air stepping and tactile upright stepping at the end of the training session of 1 month, then at the age of 3 months, then at the age of 5 months.

Such experiment enables to compare the skills between the trained infants and the infants of the same age, which have not been trained.

Moreover, an osteopath-physiotherapist has examined each of the three infants at the end of the training in order to detect any anomaly. The osteopath-physiotherapist has also examined the three infants put on the device according to the invention.

The training was conducted by the mother of each infant, the mother recording the covered distances by the infant, the infant's awareness, the infant's cries and the infant's behavior at each daily training session. Moreover, ones a week, the mother has had to record a video of the training.

Besides, at each visit of the infant and his mother, the infant's sensorimotor development has been analyzed, and the mother had to answer a questionnaire.

The experiment showed that:

The device according to the invention is easy to use on the infants.

The infants cry mainly at the beginning of the training, because the infants were trained before feeding.

The hands of the mother seem to be a good support to the infant feet, in order to help him to push with his legs. The best method is to use one hand behind one foot, helping the infant to make an alternate movement of his legs.

An infant has crawled approximately 100 meters in 1 month (0,5 meter to 6 meters each day).

An osteopath-physiotherapist examined the infants, and no problem has been detected. To the contrary, the osteopath-physiotherapist found that the muscular tonus and the symmetry of the infants had been increased.

The trained infants had a better head carried and a better trunk tonus than non-trained infants.

There are no significant differences between the trained infants and the non-trained infants for the number of movements of the legs and the arms on their spontaneous crawling tested at the different ages. However, the traveled distance is much higher for the trained than non trained infants when a support is used behind the infant's foot (like the hands of the mother): this is evident at the end of the training and even at 2 months after the infants stopped their training.

Moreover, the training had an effect on the progression of the 3D score of the movements of the joints of the legs and arms of the infant between birth, 1, 3 and 5 months. Compared to non trained infants, each trained infant has a higher increase curve of their performance in their 3D score especially between birth and just after training at 1,5 month of age and between 3 and 5 months of age.

The training had an effect on the aerial walking (an activity close to the swimming). This result is interesting, because it suggests that training with the device increases coordination of the legs.

The training had no effect on the bipedal walking, the results of the trained infants are not better than the results of the non-trained infants. It seems that a 5 min daily training of 1 month is not sufficient for training the extensor of the legs to support the weight of the infant.

Figure 7A:
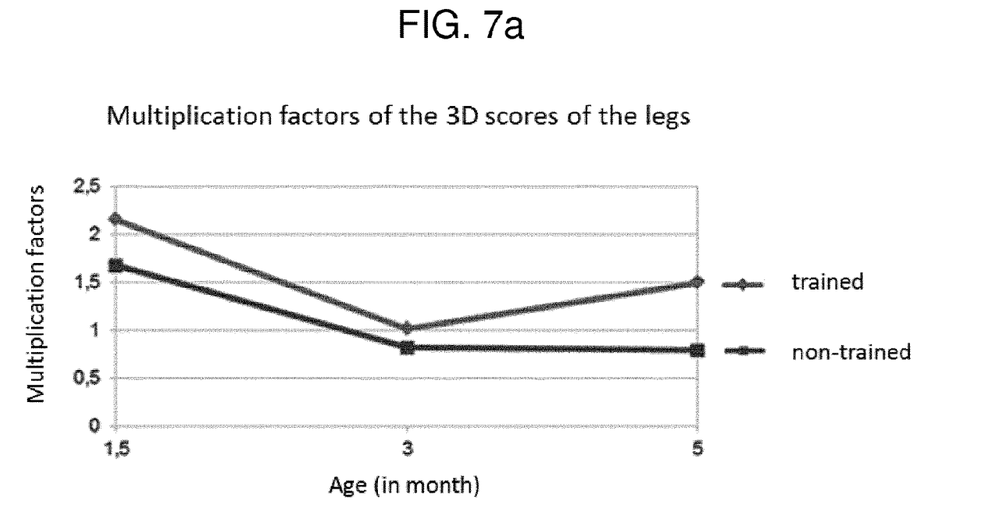
FIGS. 7a and 7b are two diagrams representing multiplication factors of 3D scores for the legs and for the arms of trained and non-trained infants, depending the age of the infants.
Figure 7B:
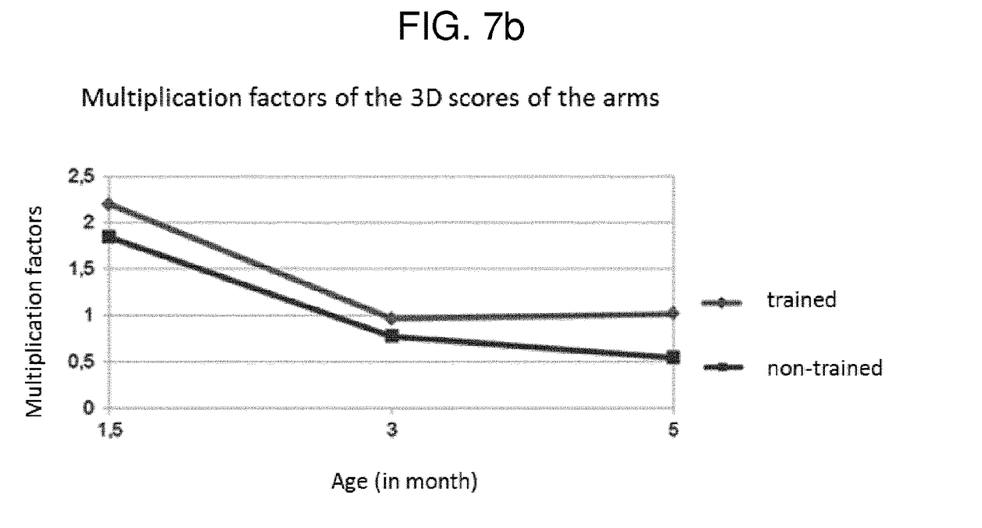

As illustrated in FIGS. 7a and 7b, which represent the average multiplication factors of the 3D scores of the three trained infants and the average multiplication factors of the 3D scores of forty non-trained infants, the training tends to increase the crawling capacity of the infants. Moreover, the multiplication factors of the 3D scores are still superior for the trained infants between 3 and 5 months, whereas the training was finished at this age. The multiplication factors of the 3D score represent the increase of the 3D score between a date and the previous date. For example, the multiplication factor of the 3D score at 1,5 month is the multiplication factor between the 3D score at the birth and at 1,5 month, and the multiplication factor of the 3D score at 3 months is the multiplication factor between the 3D score at 1,5 month and at 3 months.

Figure 8A:
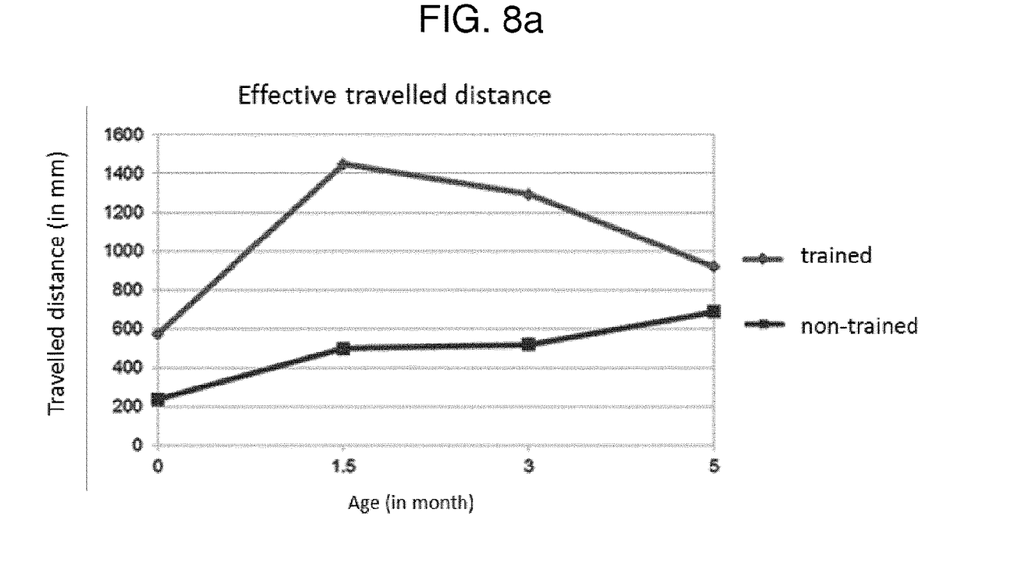
FIGS. 8a and 8b are two diagrams representing the traveled distance during crawling by the trained and the non-trained infants, depending the age of the infants.
Figure 8B:
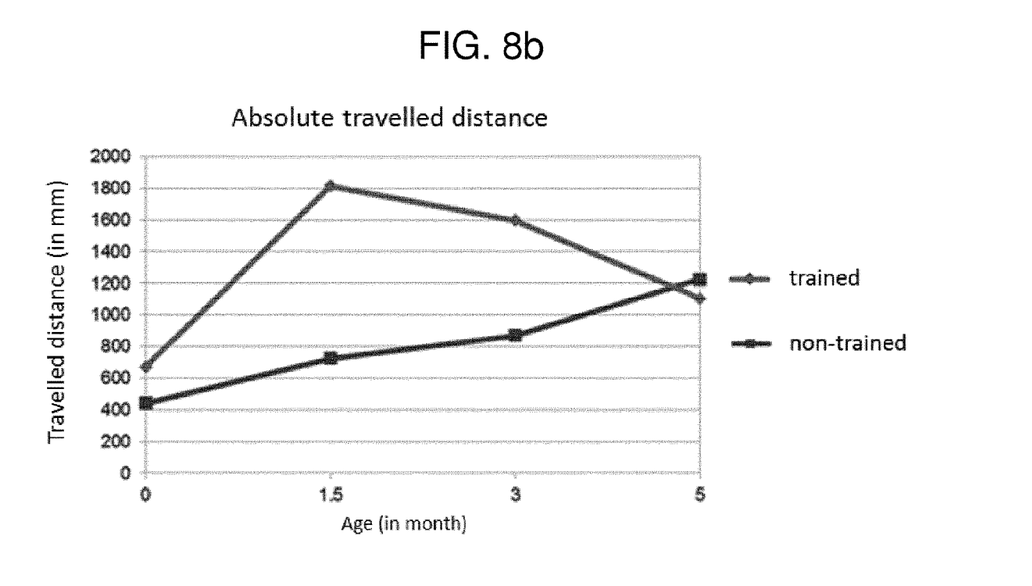

As illustrated in FIGS. 8a and 8b, the trained infants clearly crawl a longer distance than the non-trained infants from 1,5 months (at the end of the training) to 3 months. The effective travelled distance is the distance travelled by an infant according to only one direction, and during 1 minute. The absolute travelled distance is the distance travelled by the infant during 1 minute, whatever the direction. For the effective travelled distance, as illustrated in FIG. 8a, even at 5 months, the trained infants still crawl a longer distance than the non-trained.

The invention claimed is:

1. Device for assisting crawling of an infant on a training surface allowing the infant to express and develop his own maximal arm and leg muscle activity for quadrupedal propulsion comprising:
    a platform comprising a chest supporting surface for supporting a chest of the infant resting on the platform in a prone position, the chest supporting surface being inclined relative to the training surface at an angle $\beta$ between 15° and 30°, and
    rolling elements rotatably mounted on the platform in such a way that they can rotate 360 degrees relatively to the platform and arranged to be located between the platform and the training surface,
    wherein the platform is shaped so that, when the rolling elements are in contact with the training surface, the chest supporting surface of the platform is inclined relative to the training surface, so that the pelvis and the legs of the infant are in contact with the training surface.

2. Device according to claim 1, wherein the platform comprises:
    a rigid plate which is parallel to the training surface, when the rolling elements are in contact with the training surface;
    an expanded material inner structure having a first rigidity and a lower surface in contact with the rigid plate and an upper surface which is inclined relative to the lower surface, and
    a foam structure having a second rigidity, greater than the first rigidity and a lower surface in contact with the rigid plate and an upper surface which is parallel relative to the lower surface, and
    a foam outer layer which covers the upper surface of the inner structure.

3. Device according to claim 1, wherein the platform comprises a head supporting surface, formed by a foam structure, for supporting a head of the infant, the head supporting surface being parallel to the training surface when the device is positioned with the rolling elements in contact with the training surface.

4. Device according to claim 2, wherein the expanded material inner structure comprises:
    a chest supporting element comprising an upper and a lower surface;
    a junction element joining the chest supporting element and the head supporting element;
    the chest supporting element and the junction element comprising an upper and a lower surface;
    the upper surface of the chest supporting element and the upper surface of the junction element being covered by the foam outer layer, the upper surface of the foam outer layer that covers the upper surface of the chest supporting element and the upper surface of the foam outer layer that covers the upper surface of the junction element are inclined with an angle $\gamma$ between 35° and 55°.

5. Device according to claim 3, wherein the platform comprises a stabilizing system for preventing overturn of the device.

6. Device according to claim 5, wherein the stabilizing system comprises two balancing arms extending from both sides of the head supporting surface.

7. Device according to claim 6, wherein at least one rolling element is rotatably mounted on each balancing arm in such a way that it can rotate 360 degrees.

8. Device according to claim 6, wherein each balancing arm is bent so that the balancing arms do not obstruct movements of infant's arms when the infant is crawling.

9. Device according to claim 1, wherein the platform comprises two notches arranged on both sides of the infant's shoulders so as to leave the infant's arms unconstrained.

10. Device according to claim 1, wherein the platform comprises a harness coat for securing the infant on the platform and wrapping the infant on the platform.

11. Device according to claim 10, wherein the harness coat comprises several pieces of flexible fabric material adapted to overlap, and connecting elements for connecting the overlapping pieces together.

12. Method of using a device according to claim 1, comprising:
    putting the infant on the device so as the chest of the infant rests on the chest supporting surface;
    analyzing the infant crawling by analyzing an infant's crawling pattern.

13. Method of using a device according to claim 12, comprising the following steps:
    putting the infant on the device so as the chest of the infant rests on the chest supporting surface;
    stimulating the infant so as to make the infant crawling;
    analyzing the infant's crawling pattern by measuring the sensitivity and reactivity of the infant to the stimulus.

14. Method of using a device according to claim 1, comprising a mobility test, wherein the three following steps are repeated:
    putting the infant on the device by making the chest of the infant resting on the chest supporting surface;

leaving the infant to move freely by crawling during a time period comprised between 1 minute and 3 minutes;

recording characteristics and efficiency parameters of the infant's crawling;

wherein, the mobility test comprises a pause time between each series of the three previous steps.

15. Method according to claim 14, wherein, if the infant does not crawl during the mobility test, the method comprises the following step:

repeating the mobility test by passively helping the infant to crawl by using a pushing support, enabling said infant to push with his legs in the pushing support.

16. Method according to claim 15, wherein, if the infant does not crawl during the mobility test with the pushing support, the method comprises the following step:

repeating the mobility test by actively helping the infant to crawl by pushing said infant in order to initiate a crawling movement from the infant, and passively helping said infant by keeping the pushing support.

17. Method according to claim 12, comprising at least one of the following steps, so as to increase the efficiency of the use of the device:

projecting optic flows around the infant so as to give an illusion of movement to said infant;

modifying the slope of the training surface so as to increase or decrease the difficulty of crawling for said infant;

using motivation factors as music, maternal voice, moving objects and/or odors, so as to motivate said infant to crawl;

using adhesive socks worn by said infant so as to increase the adhesion of the feet of said infant to the training surface.

18. Device according to claim 3, wherein the expanded material inner structure comprises:

a chest supporting element comprising an upper and a lower surface;

a junction element joining the chest supporting element and a head supporting element, the junction element comprising an upper and a lower surface;

the upper surface of the chest supporting element and the upper surface of the junction element being covered by the foam outer layer, the upper surface of the foam outer layer that covers the upper surface of the chest supporting element and the upper surface of the foam outer layer that covers the upper surface of the junction element are inclined with an angle γ between 35° and 55°.

19. Device according to claim 7, wherein each balancing arm is bent so that the balancing arms do not obstruct movements of infant's arms when the infant is crawling.

20. Method according to claim 13, comprising at least one of the following steps, so as to increase the efficiency of the use of the device:

projecting optic flows around the infant so as to give an illusion of movement to said infant;

modifying the slope of the training surface so as to increase or decrease the difficulty of crawling for said infant;

using motivation factors as music, maternal voice, moving objects and/or odors, so as to motivate said infant to crawl;

using adhesive socks worn by said infant so as to increase the adhesion of the feet of said infant to the training surface.

21. Method according to claim 14, comprising at least one of the following steps, so as to increase the efficiency of the use of the device:

projecting optic flows around the infant so as to give an illusion of movement to said infant;

modifying the slope of the training surface so as to increase or decrease the difficulty of crawling for said infant;

using motivation factors as music, maternal voice, moving objects and/or odors, so as to motivate said infant to crawl;

using adhesive socks worn by said infant so as to increase the adhesion of the feet of said infant to the training surface.

22. Method according to claim 15, comprising at least one of the following steps, so as to increase the efficiency of the use of the device:

projecting optic flows around the infant so as to give an illusion of movement to said infant;

modifying the slope of the training surface so as to increase or decrease the difficulty of crawling for said infant;

using motivation factors as music, maternal voice, moving objects and/or odors, so as to motivate said infant to crawl;

using adhesive socks worn by said infant so as to increase the adhesion of the feet of said infant to the training surface.

23. Method according to claim 16, comprising at least one of the following steps, so as to increase the efficiency of the use of the device:

projecting optic flows around the infant so as to give an illusion of movement to said infant;

modifying the slope of the training surface so as to increase or decrease the difficulty of crawling for said infant;

using motivation factors as music, maternal voice, moving objects and/or odors, so as to motivate said infant to crawl;

using adhesive socks worn by said infant so as to increase the adhesion of the feet of said infant to the training surface.

* * * * *